United States Patent [19]

Love

[11] Patent Number: 4,498,836
[45] Date of Patent: Feb. 12, 1985

[54] LOADING RAMP FOR TRUCK BED

[76] Inventor: Richard R. Love, Box 468, Buhl, Id. 83316

[21] Appl. No.: 419,576

[22] Filed: Sep. 17, 1982

[51] Int. Cl.³ ............................................. B60P 1/26
[52] U.S. Cl. ..................................... 414/537; 14/71.3
[58] Field of Search ................ 414/537, 538; 14/71.3, 14/71.7

[56] References Cited

U.S. PATENT DOCUMENTS 3,142,394 7/1964 Schwartz ............................ 414/537
3,694,840 10/1972 Loblick ................................ 14/71.7
4,222,698 9/1980 Boelter ............................ 414/537 X
4,257,136 3/1981 Loblick ............................... 14/71.3

FOREIGN PATENT DOCUMENTS 56-825 5/1981 Japan .................................. 414/537

Primary Examiner—Robert J. Spar
Assistant Examiner—Ken Muncy
Attorney, Agent, or Firm—Kemon & Estabrook

[57] ABSTRACT

A retractable ramp or runway is pivotally connected to the bed of a truck or trailer to facilitate the loading of heavy machinery or equipment upon the bed. Fluid pressure actuated members are connected to the ramp or runway for elevating same from an inclined position to a position level with the bed of the truck or trailer.

10 Claims, 6 Drawing Figures

LOADING RAMP FOR TRUCK BED

BACKGROUND OF THE INVENTION

The present invention is directed to ramps or runways for trucks or trailers which facilitate the loading and unloading of vehicles or heavy machinery and equipment.

A truck or trailer provided with a pivotally mounted ramp or runway must be provided with fluid actuated means capable of raising and lowering the ramp or runway with respect to the ground and the bed of the truck or trailer. The elevating means usually embodies a piston and cylinder structure and the weight of the payload to be handled by the ramp or runway determines the size and number of piston and cylinder devices. The elevating means must also be capable of maintaining the ramp or runway in an elevated position with or without a load thereon.

SUMMARY OF THE INVENTION

The present invention is directed to an improved mechanism for actuating a ramp or runway for a truck or trailer. The ramp or runway is pivotally mounted upon the end of a bed of a truck or trailer with fluid actuated members connected to said ramp or runway and the end of said truck or trailer. The fluid actuated members are connected at one of their ends to the lower or bottom surface of the ramps or runways with the other end connected to a toggle plate that is carried by a support connected to the end of the bed of the truck or trailer. A second member, disposed in spaced parallel relation to the fluid actuated members, has one end connected to said ramp with the other end connected to said toggle plate in spaced relation to the other toggle plate connection. In the present invention the use of maunal locks is not required to hold the ramp in a raised or elevated position. The fluid actuated members in conjunction with the second member readily maintain the ramp in its elevated position.

DESCRIPTION OF THE PREFERRED EMBODIMENTS

Figures 1, 2:
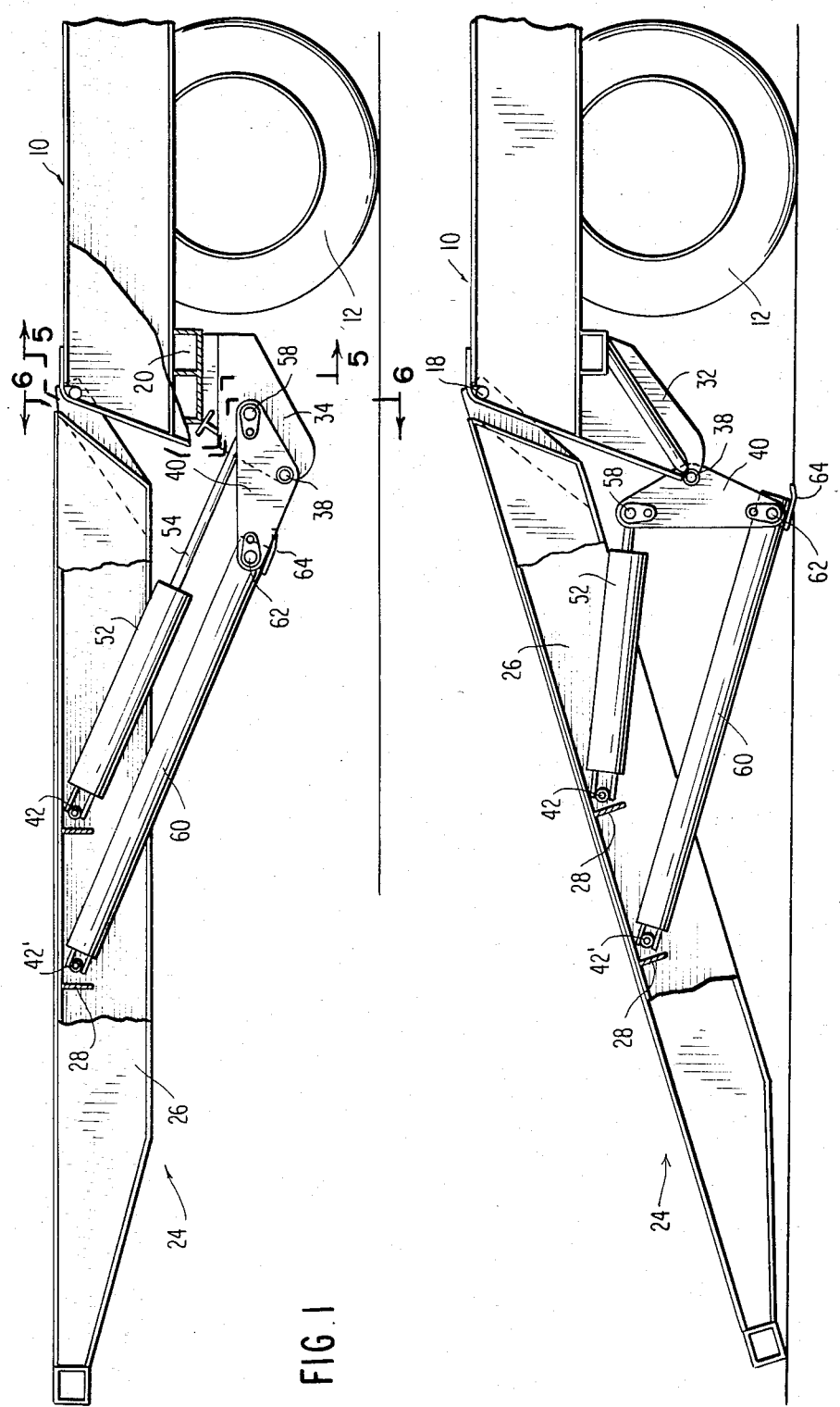
FIG. 1 is a side elevational view of the rear portion of a truck or trailer with the ramp or runway of the present invention connected thereto and in an elevated position.
FIG. 2 is a view similar to FIG. 1 showing the ramp or runway in a down or lowered position.
Figure 3:
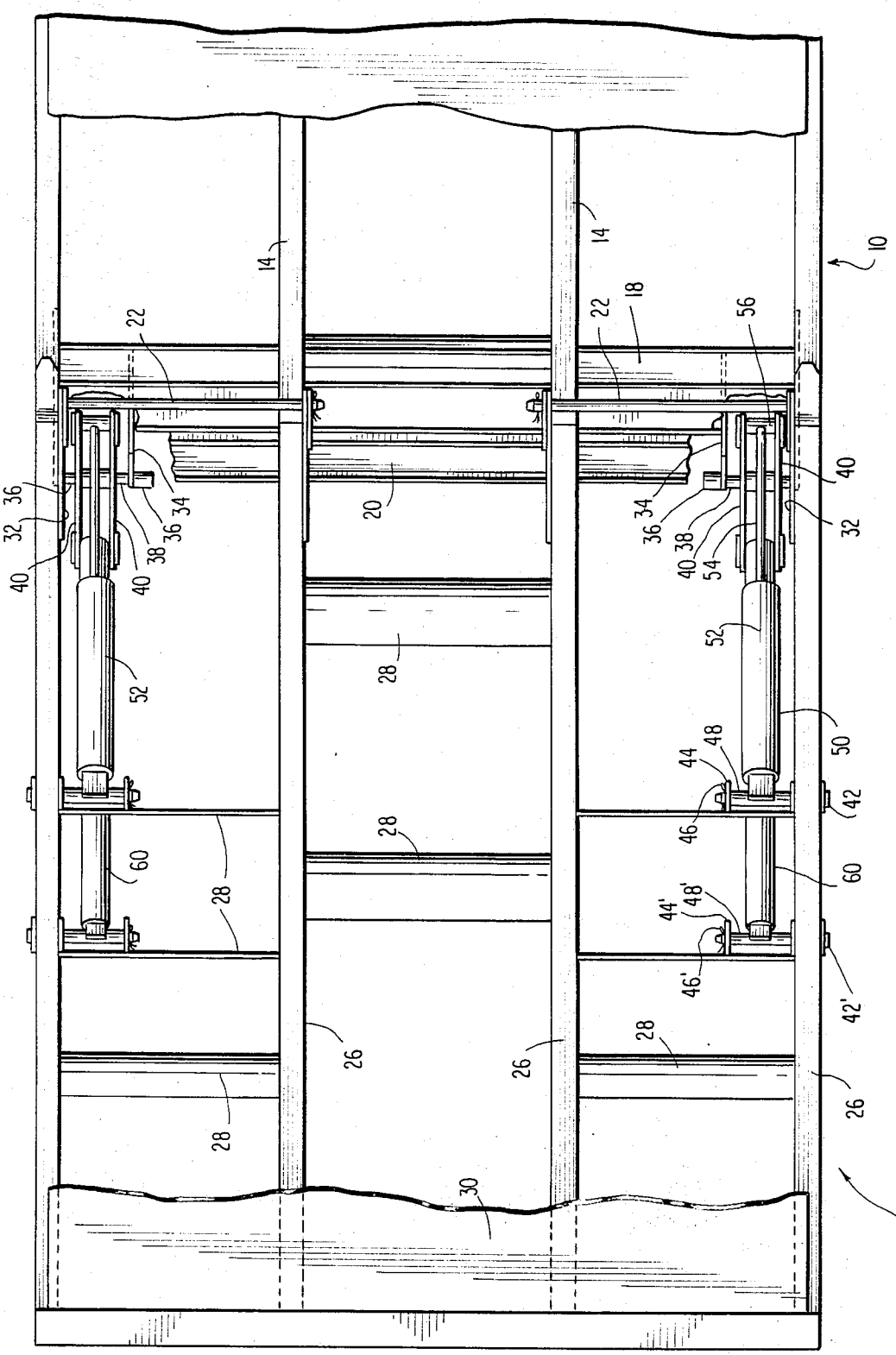
FIG. 3 is a top plan view of the ramp or runway pivotally connected to the truck or trailer with a portion of the decking removed.
Figure 5:
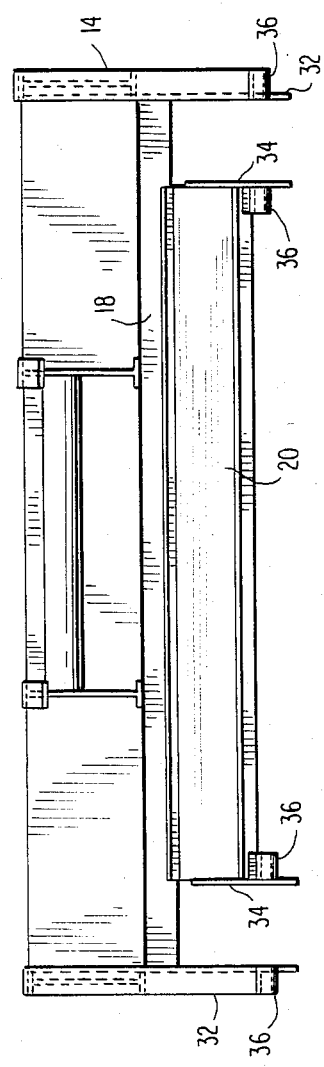
FIG. 5 is a sectional view taken on the plane 5—5 of FIG. 1.

Referring to FIGS. 1 and 3 of the drawings there is shown the end portion of the bed 10 of a truck or trailer which is supported upon a pair of conventional wheels 12. The truck or trailer bed 10 is formed from a plurality of horizontally spaced members 14 that are provided with a suitable decking 16. The rearmost ends of the members 14 are provided with a transverse brace member 18, FIG. 5, which has depending therefrom, throughout the major portion of its length, a support member 20.

The rearmost ends of each pair of members 14 is provided with a pin 22 to which is pivotally connected by a piano type hinge, not shown, a ramp or runway 24. The ramp or runway 24 is formed from several pairs of horizontally spaced members 26 that are provided with suitable bracing or spacing elements 28. The members 26 of the ramp 24 are provided with a decking 30 so that the ramp or runway conforms to the bed of the truck or trailer 10.

The outermost members 14 of the truck or trailer bed 10 are each provided with a depending brace member 32 while the ends of the support member 20 are each provided with a depending brace member 34. The lowermost ends of the brace members 32 and 34 are formed with aligned bearing supports 36 for receiving a pivot pin 38 which has secured thereto in spaced parallel relation a pair of plate members 40. The plate members 40 are of triangular configuration with the pivot pin 38 being located in the apex of the plate members, which plate members have leg portions of different lengths extending from the apex. While the plate members 40 are shown as having leg portions of different length it is to be understood that the pivot pin 38 can be so located on the plate members 40 that the leg portions will be of the same or equal lengths.

Figure 6:
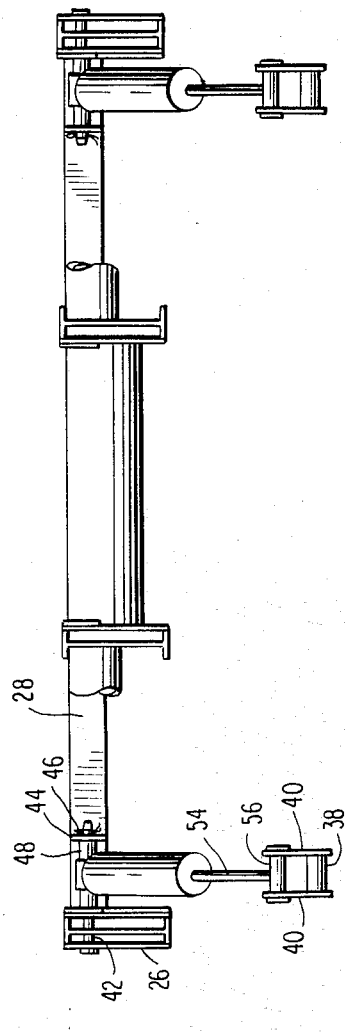
FIG. 6 is a sectional view taken on the plane 6—6 of FIG. 1.

The outermost members 26 of the ramp or runway 24 have mounted therein one end of a pin 42 with the other end of the pin extending through a bracket 44 carried by one of the bracing elements 28. The pin 42 is secured to the member 26 and bracket 44 by a suitable fastening member, such as a cotter pin 46 and said pin 42 is provided with a bearing sleeve 48. The sleeve 48 has secured thereto a yoke member 50 that is affixed to one end of a cylinder 52 with a piston rod 54 projecting from the other end of the cylinder and terminating in a sleeve 56 arranged in a plane normal to the longitudinal axis of the piston rod. The sleeve 56 is interposed between the plate members 40, FIG. 3, where it is secured to a pivot pin 58 that projects through the ends of one of the legs of the plate members 40, FIG. 6. The other leg of the plate members 40 have one end of an elongated tube 60 positioned therebetween with said end being provided with a pivot pin 62, FIGS. 1 and 2, for securing the tube to said plate members. The end of the tube 60 is provided with a foot plate 64 which is adapted to engage the ground and act as a support when the ramp or runway is in its lowered position. The other end of the tube 60 is pivotally connected to the outermost spaced member 26 in the same manner as the end of cylinder 52 is connected to said said spaced member, as shown in FIG. 3, and the same reference numerals, primed, are utilized.

In the use of the ramp or runway of the present invention the ramp or runway structure is pivotally connected to the bed of a truck or trailer by means of the piano type hinge and the plate members 40 are pivotally connected to the brace members 32 and 34. The plate members 40 are connected to an end of the piston rod 54 and to an end of the tube 60 with the other end of each of the cylinder 52 and tube 60 being connected to the outer spaced members 26 of the ramp or runway. The cylinder 52 is connected to a source of fluid pressure, not shown, for actuating the piston in the cylinder thus causing the piston rod 54 to be advanced or retracted.

The extension of the piston rod 54 with respect to the cylinder 52 will cause the plate members 40 to move about the pivot pin 38, in a clockwise direction when viewing FIG. 2, thereby causing the pivot pin 62 to engage and force the tube 60 outwardly away from the pivot pin 38. The foregoing will result in the ramp or runway being elevated about its pivotal connection with the bed of the trailer or truck to a substantially horizontal position, as shown in FIG. 1. The movement of the tube 60 through the pivotal movement of the plate members 40 will result in the pivot points 42' and 62, of the tube 60, FIG. 1, being locked in a substantially straight line by the cylinder 52 and piston 54 under the pressure of the fluid medium. Thus force is transmitted by the plate members 40 to the tube 60 and the ramp or runway 24 for raising same under the action of the cylinder 52 and piston rod 54. At the same time the cylinder 52 and piston rod 54 are transmitting force through the pivotal connection 48 of the cylinder 52 with the spaced members 26 from the plate members 40 to the ramp or runway for raising same to a substantially horizontal position. The foregoing arrangement tends to enable the cylinder 52 and piston rod 54 to double its lifting capacity as it exerts lifting force on ramp or runway 24 at the pin 42 and sleeve 48 and on pivot pin 56 of the plate members 40 and at the same time imparting lifting force through plate members 40 and pivot pin 38 to tube 60 and through pivot pin 42' to the ramp or runway 24. Thus when the piston rod 54 is extended from the cylinder 52, by fluid medium, the plate members 40 are rotated in a clockwise direction, from the disclosure of FIG. 2 to that of FIG. 1, to wherein the tube 60 and the pivot pins 42' and 62 are in alignment with the pivot pin 38 of the plates 40, as shown in FIG. 1. This arrangement results in the ramp or runway being maintained in an elevated or raised position and thus avoids the necessity of using a manual lock to hold the ramp in its raised position.

The withdrawal of fluid from the cylinder 52 will cause the plate members 40 to move about the pivot pin 38 to wherein the pivot pin 58 in the plate members 40 will approach the end of cylinder 52. The counterclockwise movement, when viewing FIGS. 1 and 2, of the plate members 40 about the pivot pin 38 will lower the end of tube 60 so that the foot plate 64 will engage upon the surface which the truck or trailer is positioned. This arrangement will result in the ramp or runway being braced by said tube and footplate and thus providing for a relatively stable ramp or runway.

Figure 4:
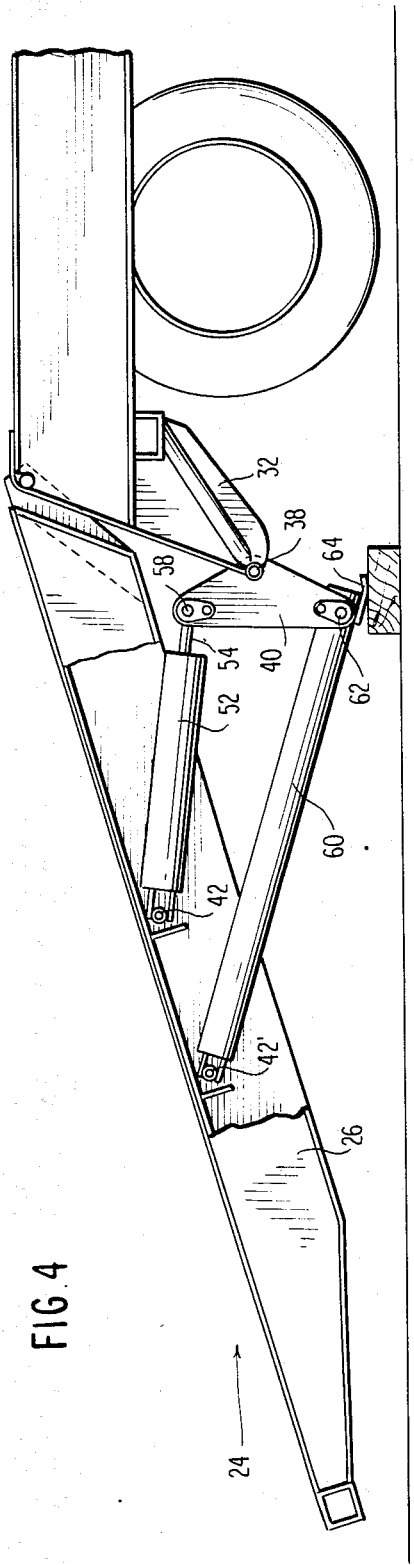
FIG. 4 is a side elevational view showing the ramp actuating mechanism in use for elevating a wheel of the truck or trailer.

As illustrated in FIG. 4 a block of wood 66 or some similar item maybe placed under the foot plate 64 which will result in the raising or elevating a rear wheel 12 of the truck or trailer to a height whereby the tire maybe changed.

Although the foregoing description is necessarily of a detailed character, in order that the invention maybe completely set forth, it is to be understood that the specific terminology is not intended to be restrictive or confining, and that various rearrangements of parts and modifications of detail maybe resorted to without departing from the scope or spirit of the invention as herein claims.

I claim:

1. An equipment carrying truck or trailer in combination with a ramp or runway for loading and unloading such equipment comprising:

a longitudinally extending ramp hingedly connected to the rear of the truck for movement between a raised, level position and a downwardly inclined, ground engaging position;

a pair of brace members secured to the rear of said truck and depending therefrom in spaced parallel relation;

a pair of plate members arranged in spaced parallel relation to one another and connected to said brace members by a pivot pin;

a power cylinder and piston with one end of the cylinder pivotally connected to the central portion of said ramp;

an elongated tube having one end pivotally connected to the central portion of said ramp and arranged in longitudinally spaced relation to said power cylinder and piston;

said piston of said power cylinder and piston pivotally connected to one end of said plate members;

the other end of said tube pivotally connected to the other end of said plate members;

said pivot pin being positioned intermediate the ends of said plate members with said plate members being moved about said pivot pin by said power cylinder for moving said power cylinder and piston into parallel relationship with said tube contemporaneous with moving said ramp about its hinged connection to the rear of the truck to its raised, level position.

2. The invention as claimed in claim 1 wherein said plate members are of triangular configuration with said pivot pin of said brace members being located in the apex of said plate members.

3. The invention as claimed in claim 2 wherein said plate members have leg portions of different lengths extending from said apex of said plate members.

4. The invention as claimed in claim 3 wherein the pivotal connections of said tube with said plate members is at the end of the long legs of said plate members.

5. The invention as claimed in claim 3 wherein the pivotal connections of said piston rod with said plate members is at the end of the short legs of said plate members.

6. The invention as claimed in claim 2 wherein the pivotal connections of said tube with said ramp and said plate members and the pivotal connection of said plate members with said brace members are disposed in a common plane upon the actuation of said piston rod by said power cylinder.

7. The invention as claimed in claim 1 wherein said brace members are formed with aligned bearing supports for receiving said pivot pin with said plate members secured to said pivot pin.

8. The invention as claimed in claim 1 wherein the pivotal connection of said cylinder with said ramp is closer to the hinge connection of said ramp with said truck than the pivotal connection of said tube with said ramp and the pivotal connection of said tube with said ramp is closer to the free end of the ramp than the hinged connection of said cylinder to said ramp.

9. The invention as claimed in claim 1 wherein said power cylinder exerts lifting force on said ramp through the pivotal connection of said power cylinder and said ramp contemporaneous with exerting lifting force through the pivotal connection of said piston rod with said plate members and the pivotal connection of said plate members with said tube.

10. The invention as claimed in claim 1 wherein said tube is provided with a foot plate adjacent its pivotal connection with said plate members for supporting said ramp in its lowered position.

* * * * *